(12) United States Patent
Lin et al.

(10) Patent No.: US 7,283,578 B2
(45) Date of Patent: Oct. 16, 2007

(54) SYSTEM AND METHOD TO ADJUST SEARCHER THRESHOLD PARAMETER OF RAKE RECEIVER

(75) Inventors: Che-Li Lin, Taoyuan (TW); Sheng-Jie Chen, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 764 days.

(21) Appl. No.: 10/377,453

(22) Filed: Feb. 28, 2003

(65) Prior Publication Data

US 2003/0165132 A1 Sep. 4, 2003

(30) Foreign Application Priority Data

Mar. 1, 2002 (TW) ............................. 91103745 A

(51) Int. Cl.
*H04B 1/69* (2006.01)
*H04B 1/707* (2006.01)
*H04B 1/713* (2006.01)

(52) U.S. Cl. ...................... 375/130; 370/342
(58) Field of Classification Search .............. 375/130; 370/342
See application file for complete search history.

(56) References Cited

U.S. PATENT DOCUMENTS

| | | | | |
|---|---|---|---|---|
| 4,034,340 A * | 7/1977 | Sant'Agostino | ............. | 714/705 |
| 6,526,090 B1 * | 2/2003 | Papasakellariou | ........... | 375/136 |
| 6,985,467 B2 * | 1/2006 | Lomp et al. | ................. | 370/335 |
| 7,010,073 B2 * | 3/2006 | Black et al. | ................. | 375/355 |
| 2003/0013457 A1 * | 1/2003 | Amerga et al. | ............. | 455/456 |
| 2003/0072277 A1 * | 4/2003 | Subrahmanya et al. | ..... | 370/320 |
| 2004/0071193 A1 * | 4/2004 | Atarashi et al. | ............ | 375/144 |
| 2004/0196893 A1 * | 10/2004 | Oh et al. | .................... | 375/148 |

* cited by examiner

*Primary Examiner*—David C. Payne
*Assistant Examiner*—Erin M. File
(74) *Attorney, Agent, or Firm*—Birch, Stewart, Kolasch & Birch, LLP

(57) ABSTRACT

This present invention is a system and method to adjust a searcher threshold parameter of a RAKE receiver. The adjusting system includes a searcher, a power estimator, and a parameter control apparatus. When the searcher finds and acquires a new path signal, the power estimator will estimate the power of the new path signal and that of the other path signals. The parameter control apparatus will calculate and monitor the power ratio corresponding to the new path signal. If the power ratio remains smaller than a predetermined power ratio parameter for a first predetermined times, the parameter control apparatus will increase the value of the threshold parameter. If the power ratio remains unchanged for a second predetermined times, the parameter control apparatus will lower the value of the threshold parameter. After that, the searcher will acquire the path signals among the multipath signal being searched in accordance with the adjusted threshold parameter. With this adjusted threshold parameter, the present invention can improve the sensitivity of the searcher, acquire the correct path signals in various environments, and provide the correct position of the path signal to the RAKE receiver.

22 Claims, 5 Drawing Sheets

SYSTEM AND METHOD TO ADJUST SEARCHER THRESHOLD PARAMETER OF RAKE RECEIVER

BACKGROUND OF THE INVENTION

1. Field of the Invention

The present invention relates to an adjusting system and, more particularly, an adjusting system for adjusting a threshold parameter in a wireless receiver in a Code Division Multiple Access (CDMA) communication system. The wireless receiver receives a plurality of external multipath signal. The adjusting system could minimize the probability of acquiring undesired path signals or losing desired path signals.

2. Description of the Prior Art

Spread-spectrum communication systems have been broadly used in the recent years. The Code Division Multiple Access (CDMA) communication technology is adopted in Third Generation Mobile Telephony, and the utilization of the rake receiver is to separate multipath propagated signal components in the CDMA system.

In general, the path signal components must be separated from each other by at least one chip of a spreading code. The rake receiver comprises rake fingers and a delay estimator. Each of these fingers are dispreading and diversity combination, and the delay estimator has a matched filter for each antenna branch and an allocation block for the rake fingers. A signal, received by a spreading code used for signal spreading, of the matched filter is correlated by different delays. The timing of the spreading code then is changed in steps of one chip. When the correlation is high, a multipath propagated signal component can be found and received at the delay found.

The signal will include not only the desired signal but also noise and interference caused by other users or systems. In systems utilizing diversity, the interference of noise can be decreased by a Maximal Ratio Combining (MRC) method. Signals of this method were received via separate antennas weighted in proportion to the signal power of the separate antenna branches. However, this method presumes that the interference of each antenna is independent. This presumption is not always true in actual cellular radio networks, but it is conceivable that the same interference is present at each antenna.

The key point is that the larger ratio of desired signal to noise the less errors will be made. Two important issues are necessary: one is the correction of the timing of the spreading code corresponding to the multipath signal, and the other is that the data of the power ratio and phase corresponding to the multipath signal must be clear. The maximum ratio combiner combines the power ratio and phase of path signal obtained from the tracking unit.

The threshold parameter is a very important criterion when the searcher acquires the multipath signal. The system receives the effective path signal when the power ratio of the path signal is higher than the predetermined threshold parameter. Other path signals are regarded as noises. Consequently, the probability of acquiring undesired path signal or losing desired path signal is highly related to the determining of threshold parameter. Accordingly, it is desirable to determine a proper value of the threshold parameter for receiving the desired path signal, and decreasing the probability of acquiring undesired path signal or losing desired path signal.

SUMMARY OF THE INVENTION

The present invention provides a system or method for adjusting a threshold parameter in a rack receiver. With the adjusting system according to the present invention, the searcher adjusts the value of the threshold parameter precisely, and minimizes the probability of acquiring undesired path signal or losing desired path signal.

The present invention provides an adjusting system for adjusting a threshold parameter in a wireless receiver in a Code Division Multiple Access (CDMA) communication system. The wireless receiver receives a plurality of external multipath signals in a predetermined time period to reconstruct correspondingly an original signal. The threshold parameter has a predetermined and, later on, adjustable value. The adjusting system comprises a searcher, a power estimator and a parameter control apparatus. The searcher searches the plurality of external multipath signals. When a multipath signal is searched, a plurality of path signals having signal power higher than the predetermined threshold parameter are acquired from the multipath signal. The power estimator estimates the signal power of the multipath signals and the plurality of path signals. The parameter control apparatus then calculates each power ratio of the plurality of path signals via the signal power of each path signal to the total signal power of the multipath signals. The parameter control apparatus further stores a predetermined power ratio parameter for comparing with each power ratio of the plurality of path signals.

When the searcher acquires a new path signal, the parameter control apparatus begins to monitor the power ratio of the new path signal. When the power ratio of the new path signal remains smaller than the predetermined power ratio parameter for a first predetermined times, the parameter control apparatus increases the value of the threshold parameter. When the power ratio of the new path signal remains unchanged for a second predetermined times, the parameter control apparatus decreases the value of the threshold parameter. Afterwards, the searcher acquires the path signals of the newly-searched multipath signals with the adjusted threshold parameter.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE APPENDED DRAWINGS

The present invention will became more fully understood from the detailed description given hereinbelow and the accompanying drawings which are given by way of illustration only, and thus are not limitative of the present invention, and wherein.

DETAILED DESCRIPTION OF THE INVENTION

The present invention provides an adjusting system to reduce the probability of receiving undesired path signal or losing desired path signal. The detailed description of the invention is as follows.

Figure 1:
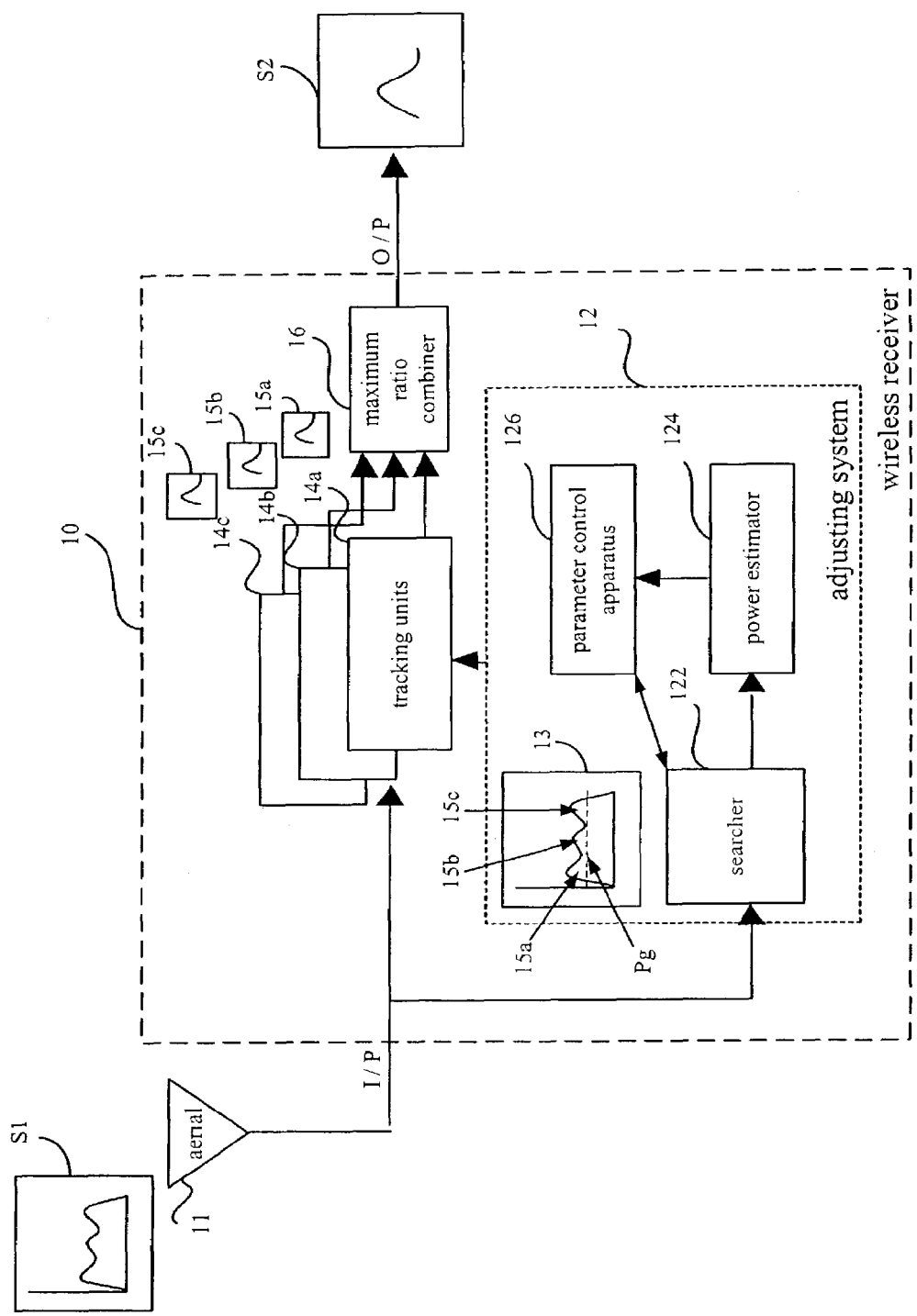
FIG. 1 is a schematic diagram of the preferred embodiment according to the present invention.

Please refer to FIG. 1. FIG. 1 is a schematic diagram of the preferred embodiment according to the present invention. The present invention provides an adjusting system 12 for adjusting a threshold parameter in a wireless receiver 10 in a Code Division Multiple Access (CDMA) communication system. The wireless receiver 10 receives a plurality of external multipath signals S1 from an external antenna 11 in a predetermined time period to reconstruct correspondingly an original signal S2. The wireless receiver 10 comprises a plurality of tracking units 14a, 14b and 14c, a maximum ratio combiner 16 and the adjusting system 12 according to the present invention. According to the other embodiment of the present invention, the wireless receiver 10 is a rake receiver and the tracking units 14a, 14b and 14c are rake finger tracking units wherein the three tracking units are utilized to simplify this case, however, more units can be accommodated. The adjusting system 12 according to the present invention comprises a searcher 122, a power estimator 124 and a parameter control apparatus 126. The searcher 122 searches the plurality of external multipath signals S1, and when a multipath signal 13 is searched, the searcher 122 acquires from the multipath signal 13 a plurality of path signals, 15a, 15b and 15c, having signal power higher than the predetermined threshold parameter Pg.

The threshold parameter Pg is a very important criterion when the searcher 122 acquires from the multipath signal 13 the path signal 15a, 15b and 15c. The system regards those path signals, for example the path signals, 15a, 15b and 15c, as effective when the path signals have power signal higher than the predetermined threshold parameter Pg. Other path signals lower than the predetermined threshold are regarded as noises. Consequently, the probability of receiving undesired path signal or losing desired path signal is highly related to the value of the threshold parameter Pg.

Figure 2:
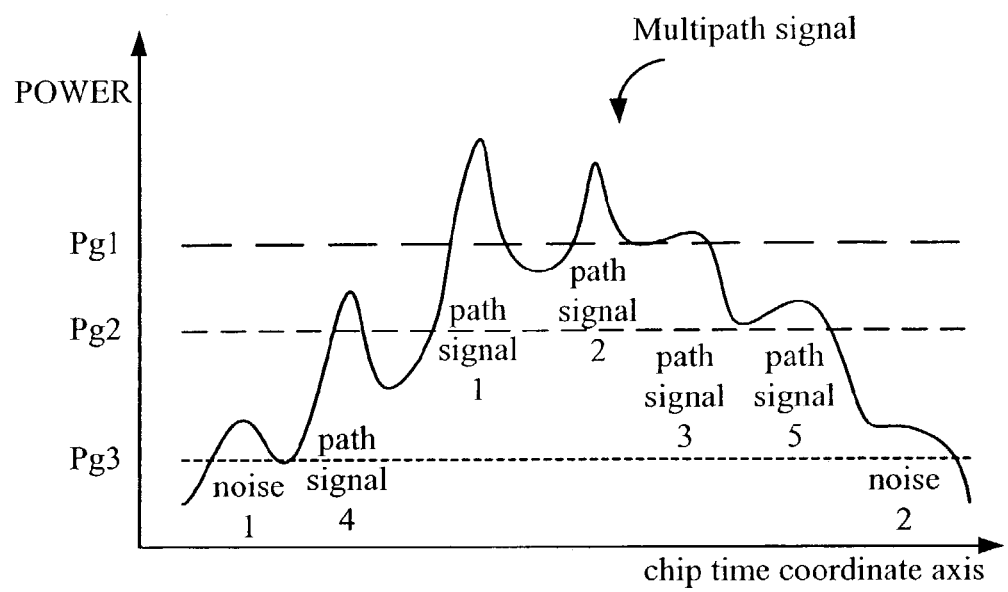
FIG. 2 is a schematic diagram of adjusting the threshold parameter.

Please refer to FIG. 2. FIG. 2 is a schematic diagram of adjusting the threshold parameter. When the searcher 122 acquires the path signals according to a larger threshold parameter Pg1, the searcher 122 acquires correct path signals, such as path signal 1, path signal 2 and path signal 3, but loses several correct path signals, such as path signal 4, and path signal 5. However, when the searcher 122 acquires the path signals according to a smaller threshold parameter Pg3, it would acquire more correct path signals, such as path signal 1, path signal 2, path signal 3, path signal 4 and path signal 5, but, at the same time, acquires some undesired path signals, such as noise 1 and noise 2. When the threshold parameter Pg is determined, it is always a trade-off between the desired signals and undesired noises. The goal is to maximize the probability of acquiring desired signals and minimize the probability of acquiring undesired noises. Only when the value of the threshold parameter, for example Pg2, is well determined, then the searcher 122 would acquire exact the desired path signals without including the undesired noises. Therefore, in order to achieve this goal, determining the value of the threshold parameter is very important and has a significant influence in the efficiency of the wireless receiver. That means, with a proper assignment of the value of the threshold parameter, the efficiency of the wireless receiver can be dramatically increased.

Figure 3:
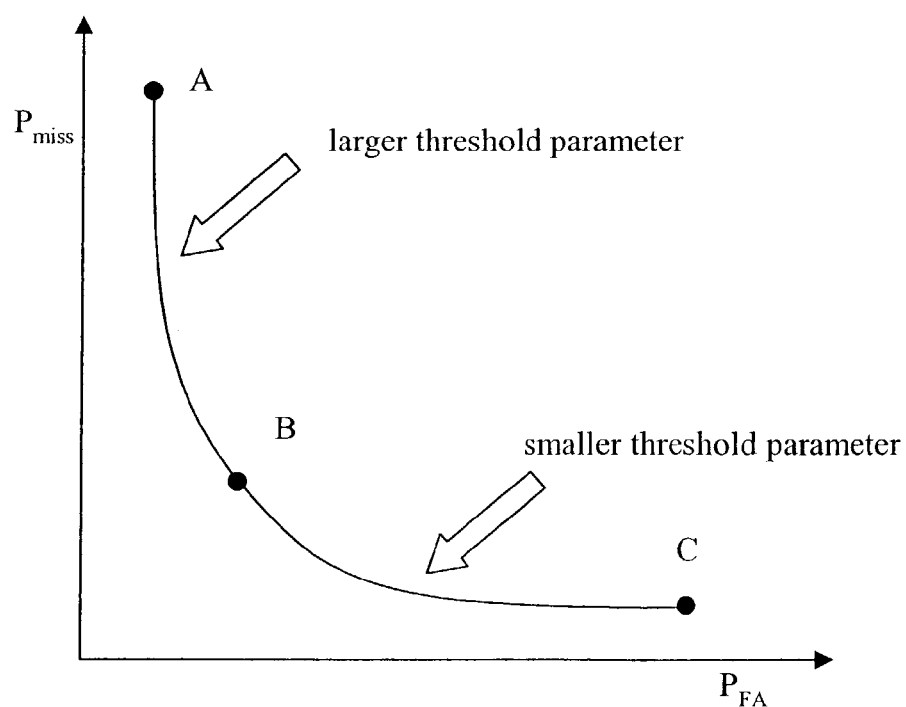
FIG. 3 is a simplified diagram illustrating the threshold parameter curve.

The relationship between the probability of acquiring undesired path signals, the probability of losing desired path signals and the value of threshold parameter is illustrated in FIG. 3. FIG. 3 is a simplified diagram illustrating the threshold parameter curve. Point A shows that when the value of the threshold parameter is assigned to be larger, the probability of acquiring undesired path signals PFA decreases, however the probability of losing desired path signals Pmiss increases. Point C shows that when the value of the threshold parameter is assigned to be smaller, the probability of acquiring undesired path signals PFA increases, however the probability of losing desired path signals Pmiss decreases.

The proper value of the threshold parameter can be calculated and assigned by a formula that takes into consideration the possibility of acquiring undesired and losing desired path signals. Please refer to FIG. 3. Point B seems to be a proper value of the threshold parameter. Due to the very nature of variation of the multipath signals over time, the threshold parameter has to be adjusted constantly to keep the wireless receiver in a good functionality. It follows the rationale that the adjusting system 12 of the present invention utilizes a method to adjust the threshold parameter in the wireless receiver 10.

Figure 4:
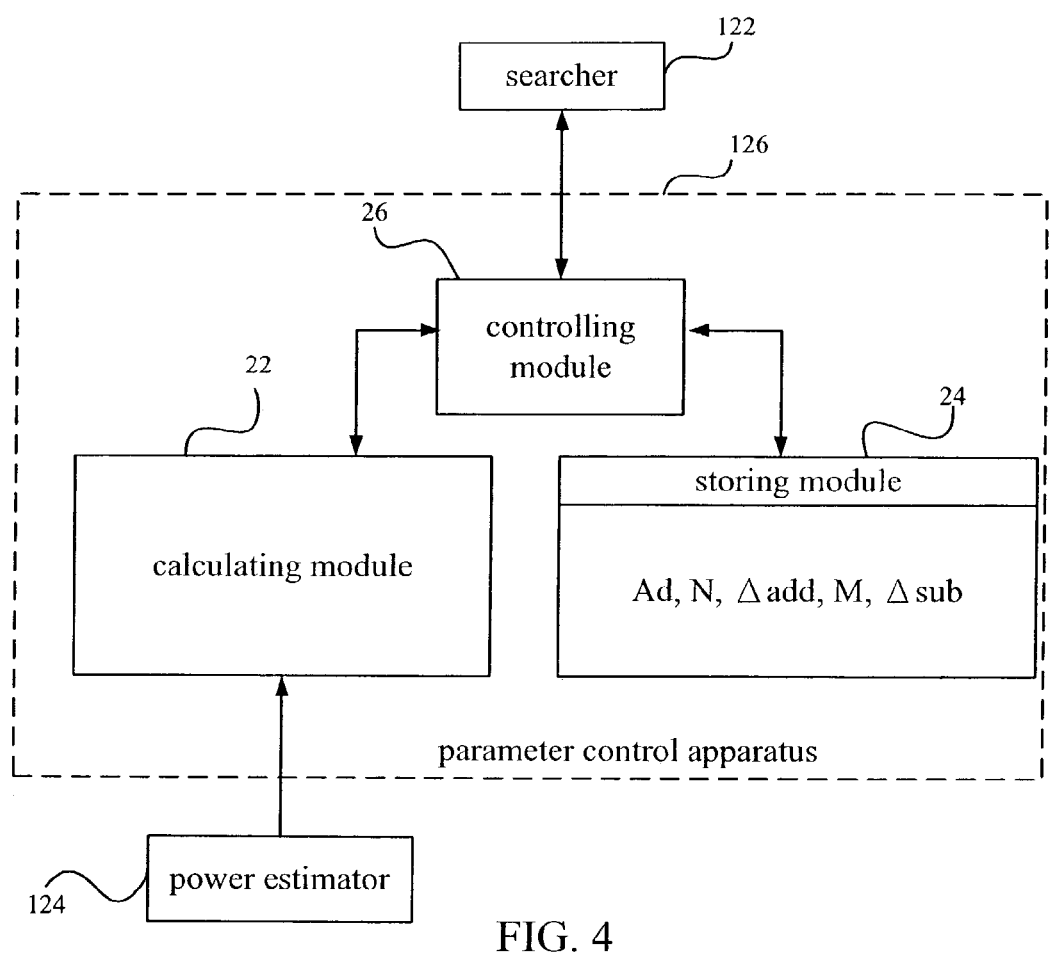
FIG. 4 is a block diagram of the parameter control apparatus according to the present invention.

The power estimator 124 in the adjusting system 12 according to the present invention is used to measure the signal power of the multipath signals 13 and the plurality of path signals, 15a, 15b and 15c. The parameter control apparatus 126 comprises a calculating module 22, a storing module 24 and a controlling module 26. Please refer to FIG. 4. FIG. 4 is a block diagram of the parameter control apparatus 126 according to the present invention. In the parameter control apparatus 126, the calculating module 22 calculates each power ratio, Aa, Ab and Ac, of the plurality of path signals 15a, 15b and 15c, via the signal power of each path signal to the total signal power of the multipath signal. The storing module 24 comprises a predetermined power ratio parameter Ad, a first predetermined times N, a predetermined increment value Aadd, a second predetermined times M and a predetermined decrement value Asub. The predetermined power ratio parameter Ad is compared with the corresponding power ratio Aa, Ab and Ac. The power ratio parameter Ad is changeable and can be adjusted by the system in accordance with the external environments.

The plurality of tracking units 14a, 14b and 14c in the wireless receiver 10 would track the time position of each path signal 15a, 15b and 15c, searched by the searcher 122. The maximum ratio combiner 16 would then combine the time position obtained by the tracking unit, 14a, 14b and 14c, and the signal power of the path signal 15a, 15b and 15c, obtained by the power estimator 124. The original signal S2 represented by the multipath signals 13 would accordingly be acquired.

It is noted that the received multipath signals S1 changes constantly due to the variation of external environment. Therefore, it is possible that a new path signal would accordingly occur. When the searcher 122 acquires a new path signal, the controlling module 26 in the parameter control apparatus 126 would then monitor the power ratio of the newly acquired path signal. When the power ratio remains smaller than the predetermined power ratio parameter Ad, which is stored in the storing module 24, for the first predetermined times N, the controlling module 26 then regards this path signal as a noise. It means that the undesired noise is deemed as a desired signal because the current value of the threshold parameter Pg is too small. To avoid this problem, the controlling module 26 then increases the value of the threshold parameter Pg with the predetermined increment value Aadd stored in the storing module 24. In another word, during the monitoring period of the first predetermined times N, if it occurs that the power ratio is once larger than the predetermined power ratio parameter Ad, the controlling module 26 should regard this path signal as a desired signal, instead of a noise. Therefore, the controlling module does not adjust the threshold parameter Pg, and stop monitoring the path signal.

Similarly, the threshold parameter Pg might sometimes be too high to acquire a new path signal. When the threshold parameter Pg remains unchanged for the second predetermined times M, which is stored in the storing module 24, and there exists any idle rake finger in the wireless receiver 10, it means that the threshold parameter Pg is too high and it might happen that some desired path signals are lost. Therefore, the controlling module 26 decreases the value of the threshold parameter Pg with the predetermined decrement value Asub stored in the storing module 24.

After adjusting the threshold parameter according to the aforementioned steps, the searcher 122 afterwards acquires the path signals of the newly-searched multipath signals with the adjusted threshold parameter Pg. The threshold parameter Pg obtained by the adjusting system 12 is not a fixed value, but is adjusted in responsive to the received external multipath signals.

Figure 5:
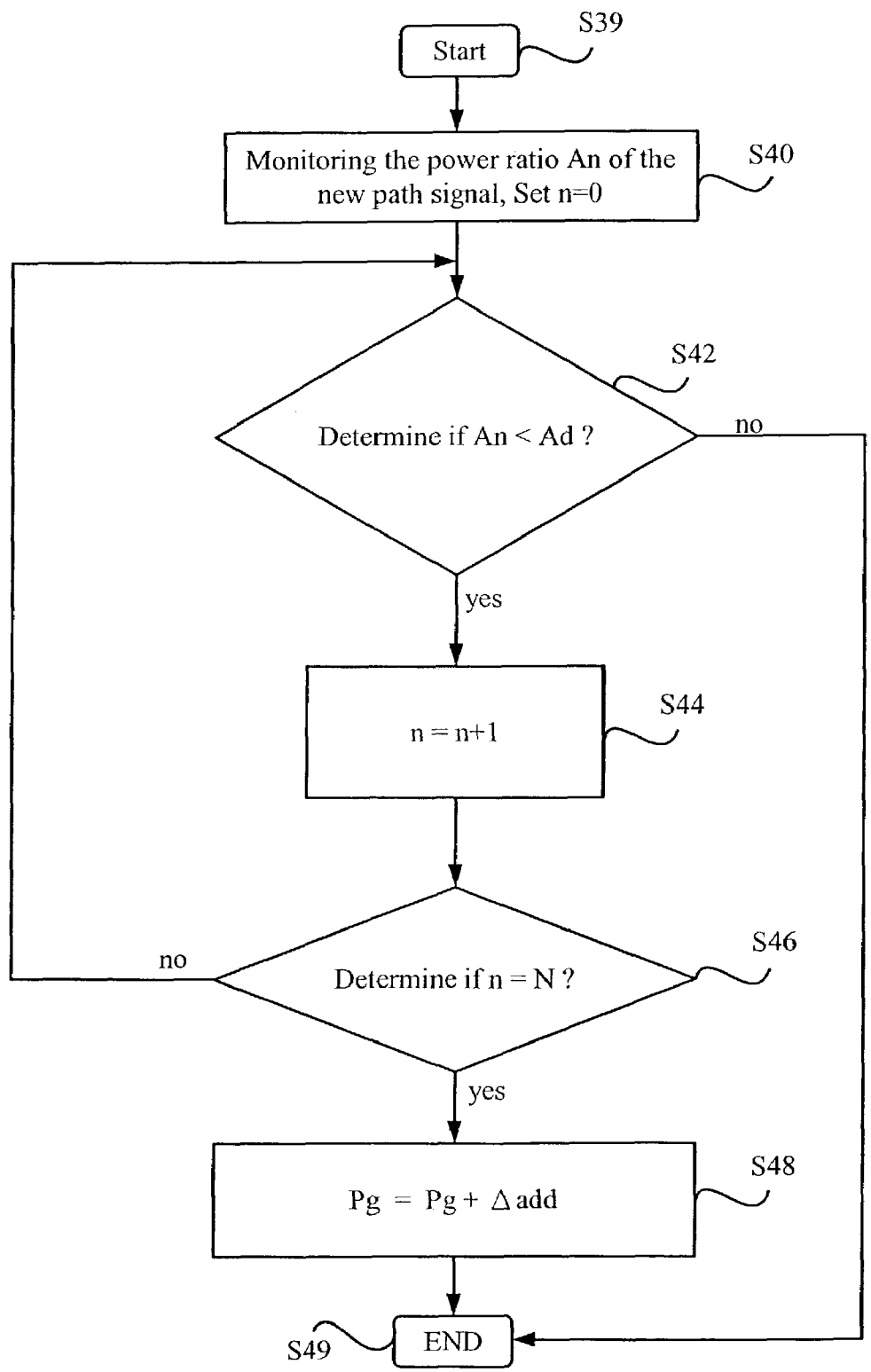
FIG. 5 is a flow chart of increasing the threshold parameter according to the present invention.

Following is the detailed description of increasing the threshold parameter according to the present invention. Please refer to FIG. 5. FIG. 5 is a flow chart of increasing the threshold parameter according to the present invention. There must be new path signals acquired before the system of the present invention starts to adjust the value of the threshold parameter. Therefore, the searcher 122 and the power estimator 124 would keep on working in the aforementioned manner until a new path signal is thus found. The procedures of increasing the value of the threshold parameter comprises the following steps:

Step S39: Start.
Step S40: Monitor the power ratio An of the new path signal Set n=0, and then go to Step S42.
Step S42: Determine if the power ratio An is smaller than the predetermined power ratio parameter Ad. If yes, go to Step S44; If no, go to Step S49.
Step S44: Set n to be n+1. Calculate the times n that the power ratio An of the new path signal is smaller than the predetermined power ratio parameter, and go to Step S46.
Step S46: Determine if the times n reaches the first predetermined times N (n=N?). If yes, go to Step S48; If no, go to Step S40.
Step S48: Increase the threshold parameter Pg with the predetermined increment value Δadd, and go to Step S49.
Step S49: End.

Figure 6:
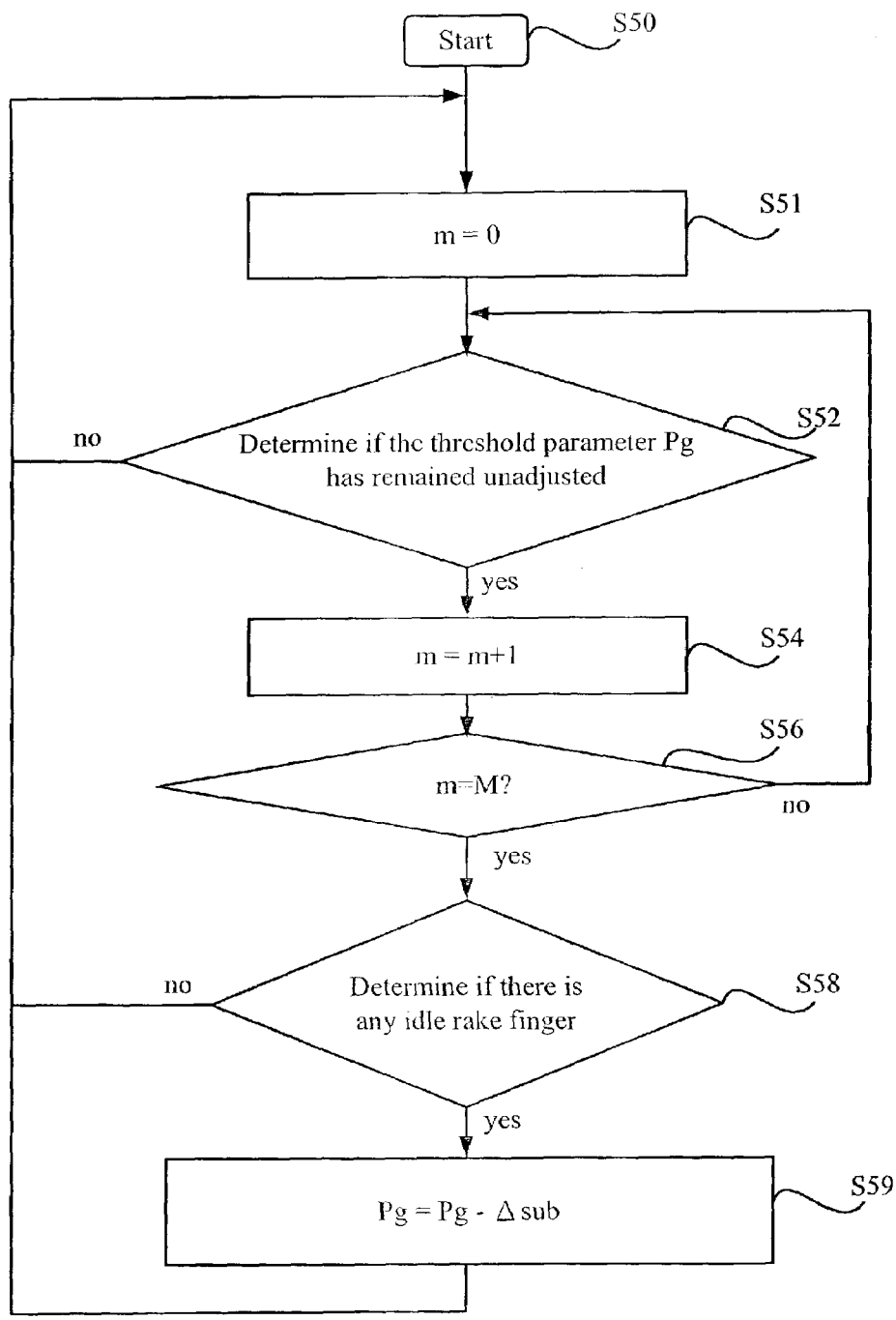
FIG. 6 is a flow chart of decreasing the threshold parameter according to the present invention.

Following is the detailed description of decreasing the threshold parameter according to the present invention. Please refer to FIG. 6. FIG. 6 is a flow chart of decreasing the threshold parameter according to the present invention. The prerequisite of decreasing the threshold parameter according to the present invention is that the threshold parameter remains unchanged for several times. Due to the fact that the external environment varies over time, if the threshold parameter remains too high and unchanged for a long period of time, the wireless receiver might lose some desired path signals. Therefore, it is necessary that the present invention takes into consideration such a circumstance, and comes out of a resolution to decrease the threshold parameter in such a circumstance. The procedures of decreasing the threshold parameter comprises:

Step S50: Start.
Step S51: Set m=0, and then go to Step S52.
Step S52: Determine if the threshold parameter Pg has remained unadjusted. If yes, go to Step S54; if no, go to Step S50.
Step S54: Set m to be m+1. Calculate the times m that the predetermined threshold parameter has been continuously used and remain unchanged. Go to Step S56.
Step S56: Determine if the times m reaches the second predetermined times M (m=M?). If yes, go to Step S58; if no, go to Step S52.
Step S58: Determine if there is any idle rake finger. If yes, go to Step S59; if no, go to Step S50.
Step S59: Decrease the threshold parameter Pg with the predetermined decrement value Δsub, and go to Step S51.

As mentioned in the above adjusting system and method, the threshold parameter is adjusted in responsive to the external environment. No matter the threshold parameter is increased or decreased, it is adjusted according to clear and precise steps in the aforementioned procedures. When a new path signal is acquired, the power ratio of the new path signal is first to be compared with the predetermined power ratio parameter. If the power ratio of the new path signal further remains smaller than the predetermined power ratio parameter for the predetermined times, the adjusting system increases the value of the threshold parameter. When the power ratio of the new path signal remains unchanged for the predetermined times and there is any idle rake finger, the adjusting system would then decrease the value of the threshold parameter. The adjusting system according to the present invention provides a method to precisely adjust the threshold parameter, and therefore minimize the probability of acquiring undesired path signals or losing desired path signals.

Those skill in the art will readily observe that numerous modification and alterations of the device may be made while retaining the teaching of the invention. Accordingly, the above disclosure should be construed as limited only by the metes and bounds of the appended claims.

What is claimed is:

1. An adjusting system for adjusting a threshold parameter in a wireless receiver, the wireless receiver receiving a plurality of external multipath signals in a predetermined time period to reconstruct correspondingly an original signal, the threshold parameter having a predetermined and adjustable value, the adjusting system comprising:
   a searcher for searching the plurality of external multipath signals, and when a multipath signal is searched, acquiring from the multipath signal a plurality of path signals having signal power higher than the predetermined threshold parameter; and
   a power estimator for estimating the signal power of the multipath signal and the plurality of path signals; and
   a parameter control apparatus for calculating each power ratio of the plurality of path signals via the signal power of each path signal to the signal power of the multipath signal, the parameter control apparatus further storing a predetermined power ratio parameter for comparing with each power ratio of the plurality of path signals;
   wherein when the searcher acquires a new path signal, the parameter control apparatus begins to monitor the power ratio of the new path signal, and wherein when the power ratio of the new path signal remains smaller than the predetermined power ratio parameter for a first predetermined times, the parameter control apparatus increases the value of the threshold parameter, and when the power ratio of the new path signal remains unchanged for a second predetermined times, the parameter control apparatus decreases the value of the threshold parameter, and the searcher afterwards acquires the path signals of the newly-searched multipath signal with the adjusted threshold parameter.

2. The adjusting system of claim 1, wherein the wireless receiver is a rake receiver.

3. The adjusting system of claim 2, wherein the rake receiver comprises a plurality of rake finger tracking units for tracking positions of the plurality of acquired path signals in the multipath signal.

4. The adjusting system of claim 3, wherein when the threshold parameter remains unchanged for the second predetermined times and there is any idle rake finger, the parameter control apparatus decreases the threshold parameter.

5. The adjusting system of claim 1, wherein when, within the first predetermined times, the power ratio of the new path signal is higher than the predetermined power ratio parameter, the parameter control apparatus keeps the threshold parameter unchanged.

6. The adjusting system of claim 1, wherein the parameter control apparatus stores a predetermined increment value for each time when the parameter control apparatus increases the value of the threshold parameter.

7. The adjusting system of claim 1, wherein the parameter control apparatus stores a predetermined decrement value for each time when the parameter control apparatus decreases the value of the threshold parameter.

8. The adjusting system of claim 1, wherein the wireless receiver comprises a maximum ratio combiner for combining the plurality of path signals to reconstruct the original signal of the searched multipath signal.

9. An adjusting method for adjusting a threshold parameter in a wireless receiver in a communication system, the wireless receiver receiving a plurality of external multipath signals in a predetermined time period to reconstruct correspondingly an original signal, and further storing a predetermined power ratio parameter, the threshold parameter having a predetermined and adjustable value, the adjusting method comprising:

searching the plurality of external multipath signals;

acquiring from, when a multipath signal is searched, the multipath signal a plurality of path signals having signal power higher than the predetermined threshold parameter;

estimating the signal power of the multipath signal and the plurality of path signals;

calculating each power ratio of the plurality of path signals via the signal power of each path signal to the signal power of the multipath signal;

comparing the predetermined power ratio parameter with each power ratio of the plurality of path signals;

beginning to, when a new path signal is acquired, monitor the power ratio of the new path signal; and increasing, when the power ratio of the new pat signal remains smaller than the predetermined power ratio parameter for a first predetermined times, the value of the threshold parameter.

10. The adjusting method of claim 9, wherein the wireless receiver afterwards acquires the path signals of the newly-searched multipath signal with the adjusted threshold parameter.

11. The adjusting method of claim 9, wherein the wireless receiver comprises a searcher for searching the plurality of external multipath signals, and when a multipath signal is searched, acquiring from the multipath signal a plurality of path signals having signal power higher than the predetermined threshold parameter.

12. The adjusting method of claim 9, wherein the wireless receiver comprises a power estimator for estimating the signal power of the multipath signal and the plurality of path signals.

13. The adjusting method of claim 9, wherein the wireless receiver comprises a parameter control apparatus for calculating each power ratio of the plurality of path signals via the signal power of each path signal to the signal power of the multipath signal, the parameter control apparatus further storing a predetermined power ratio parameter for comparing with each power ratio of the plurality of path signals; wherein when a new path signal is acquired, the parameter control apparatus begins to monitor the power ratio of the new path signal, and wherein when the power ratio of the new path signal remains smaller than the predetermined power ratio parameter for a firs: predetermined times, the parameter control apparatus increases the value of the threshold parameter.

14. The adjusting method of claim 9, wherein the wireless receiver comprises a maximum ratio combiner for combining the plurality of path signals to reconstruct the original signal of the searched multipath signal.

15. The adjusting method of claim 9, wherein the wireless receiver is a rake receiver.

16. The adjusting method of claim 9, wherein the wireless receiver stores a predetermined increment value for each time when the parameter control apparatus increases the value of the threshold parameter.

17. An adjusting system for adjusting a threshold parameter in a rake receiver in a communication system, the rake receiver receiving a plurality of external multipath signals in a predetermined time period to reconstruct correspondingly an original signal, the threshold parameter having a predetermined and adjustable value, the adjusting system comprising:

searching the plurality of external multipath signals;

acquiring from, when a multipath signal s searched, the multipath signal a plurality of path signals having signal power higher than the predetermined threshold parameter;

counting the times of the threshold parameter being used; and decreasing, when the threshold parameter remains unchanged for a second predetermined times and there exists an idle rake finger in the rake receiver, the value of the threshold parameter.

18. The adjusting method of claim 17, wherein the rake receiver afterwards acquires the path signals of the newly-searched multipath signal with the adjusted threshold parameter.

19. The adjusting method of claim 17, wherein the rake receiver comprises a searcher for searching the plurality of external multipath signals, and when a multipath signal is searched, acquiring from the multipath signal a plurality of path signals having signal power higher than the predetermined threshold parameter.

20. The adjusting method of claim 17, wherein the rake receiver comprises a parameter control apparatus for counting the times of the threshold parameter being used, and decreasing, when the power ratio of the new path signal remains unchanged for a second predetermined times, the value of the threshold parameter.

21. The adjusting method of claim 17, wherein the rake receiver comprises a maximum ratio combiner for combining the plurality of path signals to reconstruct the original signal of the searched multipath signal.

22. The adjusting method of claim 17, wherein the rake receiver stores a predetermined decrement value for each time when the parameter control apparatus decreases the value of the threshold parameter.

* * * * *